ent Office 2,709,871
Patented June 7, 1955

2,709,871
TREE WOUND DRESSING
Henry L. Brownback, Norristown, Pa.

No Drawing. Application November 30, 1951,
Serial No. 259,290

6 Claims. (Cl. 47—8)

This invention relates to tree wound dressings and processes of making and using them for sealing tree wounds.

In recent years the planting of fruit and other trees has been greatly intensified and through the processes of nature tree diseases, parasites and accidents have multiplied in the same degree.

Spraying processes have been perfected to cure certain diseases but no "bandage" or wound protecting material to cover a graft or wound has given satisfaction up to the present time.

None of the existing products aid in the healing and any that protect the tissues of the tree may also cover up insects and parasites. Thus there exist true vegetable abscesses. Also the various products which exist today dry out and disintegrate, or they, by their consistency, prevent the formation of new bark. At times they are actually poisons for plant or tree.

It is important therefore, to provide a product which is perfectly innocuous in its composition and in which can be incorporated or embodied products which are antiseptic or insecticidal, or which is antiseptic and insect repellent. Such product must on the other hand, adhere perfectly and retain for years, if necessary, its elastic qualities without preventing the formation of new bark.

One of the most frequent diseases appears to be caused by the larvae (cossus) or worms which eat the heart of the tree or cankers and Agrilus which gnaw the periphery. It is necessary in this case to close the holes or pores by a paste which is sufficiently fluid to penetrate the borings as deeply as possible and adhere to them disinfecting the whole part.

Another disease which attacks the fruit trees, in which the fruit has a stone, is due to the presence of Coryneum which yields a gum for which the sole remedy is potassium oxalate.

It has been established that there exists between the pulp and bark a generating zone which assures the development of the tree. There the cells multiply especially when the layer is uncovered, and it is believed that the damaged cells produce hormones which favor or aid the multiplication of neighboring cells.

If one can apply or favor the development of hormones the phenomenon is intensified and rapidly a healing "bulge" develops which closes the wound.

This theory is used for tree grafts, but it is dangerous to leave uncovered the wound caused by the graft as infection or drying up could develop which would soon destroy the productive capacity of the tree.

The present invention provides a new product which eliminates all of the faults and inconveniences thus far encountered and allows the incorporation in its mass of fortifying or antiseptic curative products.

The product forming the basis of this invention is obtained by heating a vegetable oil to drive off the most volatile constituents and to "blow" it with air during the heating.

The vegetable oil employed may be a semi-drying oil such as linseed, castor, cottonseed, soya bean oil. Castor oil or castor oil mixed with tung oil seems most satisfactory.

During the cooling of the oil after processing there is added to it from 0.5–1.5% of an anti-oxidizing or anti-polymerizing agent in order to stabilize it and preserve its consistency as processed.

According to the needs of the particular application one may add either a preferably finely divided filler to the product or a thinner to make it penetrate better into the interior of plants or trees being treated.

Divers other characteristics of the invention are brought out in the following detailed description:

A vegetable oil, for example, castor oil, linseed oil, cottonseed or other oil or oily body which is semi-drying in character, is placed in a heated receptacle and heated and brought to a temperature of from 200–210° centigrade, for 4 or 5 hours. During the heating the oil is "blown" with a volume of air equal to approximately 6 times the volume of the oil per minute.

The mixture (oil) thus attains a degree of oxidation and/or polymerization, so that it is "tacky" upon cooling and the blowing (processing) of the oil-air mixture is stopped just before it attains the consistency of a gum. The best material seems to be obtained when the oil is heated rapidly enough to drive off acrolein so rapidly as to be noticeably offensive.

The mixture thus produced is cooled. During the cooling from 0.5–1.5% of an oxidation and/or polymerization inhibitor is added. This inhibitor may be a chemical product such as phenyl-alpha-naphthylamine, hydro-quinone or iodine. A certain quantity of filler such as fine short asbestos fibre, ground cork, or sawdust may be then added to give the mixture greater consistency and the filler can amount to from 25% to 75% of the weight of the original oil.

In order to facilitate the use of the product thus obtained one may increase its fluidity by adding suitable quantities of propyl alcohol, carbon tetrachloride, ethyl alcohol or other diluent of the oil employed which is volatile at ordinary temperatures. The thinned product can be applied for example, by brush on all exposed surfaces, or grafts, or cuts.

When the solvent evaporates, the blown product regains its original viscosity and adheres perfectly to wood surfaces and many other surfaces forming a hermetically sealed joint and giving a perfectly protected surface which does not harden, nor crack, nor scale, but which retains its elasticity until the healing of the tree is completed.

In case it is desired to bring about a healing process which is more rapid than the normal healing, plant hormones or antiseptics may be embodied in the compound so that they may accelerate the healing process, and, at the same time, protect the tree from infection or outside parasites.

One paste or product thus obtained may be also applied to the trunks of young trees or plants to protect them from gnawing animals. For these applications it can contain a product which gives off an odor repulsive to these animals. It may also contain poisons to kill caterpillars or other insects or be viscous enough to entrap or hold them.

Castor oil blown with heat and air to a viscosity of 2000 poises at 35° C. has proved satisfactory for treating exposed under bark layers of trees when applied by painting, and equally castor oil polymerized by heating and blowing to a sticky gel is satisfactory when thinned with a solvent volatile at ordinary outdoor temperatures and miscible with the blown oil. Among the solvents used were amyl acetate, benzene, carbon tetrachloride, ethylene dichloride, methyl-ethyl ketone, toluene, and trichloroethylene. Suitably treated castor oil is commercially available under the trade name of Baker's Polycin 781, 782, 783, 785, and as a residue in France where the volatile condensate of the vapors was collected by perfumery makers and the blown castor oil residue sold as a by-product.

In France the blown castor oil residue mixed with organic solvent was used as a paint on the joining of grafts of numerous kinds of French nursery grown trees and found to be superior to the so-called grafting waxes in that it reduced the failures among the grafts.

Apparently the flexibility of the material kept it effective as a graft sealing material while other materials cracked or disintegrated.

It was found that the blown residue in solution restored injured and bare spots on trees gnawed by rabbits, and moreover its odor seemed to repel the rabbits. The injured bark and cambium structure healed themselves rapidly.

Painted over the stub ends of sawed branches it protected the exposed bark and wood better than the usual paints and tars and asphalts.

The applied blown castor oil, remaining after the evaporation of the solvent thinner, did not harden but permitted the growing bark to push it away while kept under a sealed surface.

The blown castor oil mixture painted on heart after exposing it furnished a complete protection against boring insects and moisture and under cement or metal covering it made a water-tight and insect proof coating indefinitely remaining in place yet elastic.

Wood likely to prove highly absorptive is best first coated with two coats of some paint or with a coat of shellac and a top coat of paint before applying the blown castor oil mixture. The blown castor oil material remaining after evaporation of the volatile thinner is satisfactory if sticky enough to trap bugs and insects, and may include insecticidal substances.

A Maine apple tree eaten by worms and rotten at the heart, was treated by cutting out the rotten heart leaving about 40% of the surface bark, then filled up with cement, painted with blown castor oil mixture, and bore fruit. Two years later the shaggy outer bark was eaten off by an animal from ground to branches. The remaining inner bark was painted with the thinned blown castor oil. The tree thus protected blossomed normally and yielded a good crop of apples. In the fall wart-like protuberances appeared on the sealed surface. These proved to be material pushed up by living green new bark-forming substances.

It is found that rapidly blown castor oil to have a viscosity of 2000 poises at 35° C. may need no thinner and yet may be applied by a brush to yield a satisfactory sealing coat. The blown oil preferably has a specific gravity of about 1.023.

Having thus described certain embodiments of the invention in some detail, what is claimed is:

1. The process of treating an exposed under surface of a growing plant which consists in coating it with a continuous layer of blown oil blown to a consistency just short of gum, and carrying a polymerization inhibitor to the extent of the order of 1%.

2. The process of treating an exposed under surface of a growing plant which consists in coating it with a continuous layer of blown oil blown to a consistency just short of gum, and carrying a polymerization inhibitor to the extent of the order of 1%, said blown oil carrying filler selected from the group consisting of asbestos fibre, ground cork and sawdust, not exceeding 75% of the weight of the oil.

3. The process of treating an exposed under surface of a growing plant which consists in coating it with a continuous layer of blown oil blown to a consistency just short of gum and carrying a polymerization inhibitor to the extent of the order of 1%, and also carrying a volatile solvent for the blown oil sufficient to thin it to be brushed on a surface and to dry as a lasting non-hardening coating thereon until the tree is healed.

4. The process of treating an exposed under surface of a growing plant which consists in coating it with a continuous layer of blown castor oil blown to a consistency just short of gum, and carrying a polymerization inhibitor to the extent of the order of 1%.

5. The process of treating an exposed under surface of a growing plant which consists in coating it with a continuous layer of blown castor oil blown to a consistency just short of gum, and carrying a polymerization inhibitor to the extent of the order of 1%, said blown oil carrying filler selected from the group consisting of asbestos fibre, ground cork and sawdust, not exceeding 75% of the weight of the oil.

6. The process of treating an exposed under surface of a growing plant which consists in coating it with a continuous layer of blown castor oil blown to a consistency just short of gum, and carrying a polymerization inhibitor to the extent of the order of 1%, and also carrying a volatile solvent for the blown oil sufficient to thin it to be brushed on a surface and to dry as a lasting non-hardening coating thereon until the tree is healed.

References Cited in the file of this patent

UNITED STATES PATENTS

| Number | Name | Date |
|---|---|---|
| 1,028,233 | Longfeather | June 4, 1912 |
| 1,054,751 | Cordray | Mar. 4, 1913 |
| 1,085,652 | Whitaker | Feb. 3, 1914 |
| 1,160,701 | Erwin | Nov. 16, 1915 |
| 1,521,078 | Corigliano | Dec. 30, 1924 |
| 1,906,749 | Grant | May 2, 1933 |
| 2,029,390 | Rodgers | Feb. 4, 1936 |
| 2,033,870 | Smith | Mar. 10, 1936 |
| 2,051,840 | Gerhart | Aug. 25, 1936 |
| 2,327,450 | Parker | Aug. 24, 1943 |
| 2,420,127 | Doelling | May 6, 1947 |

OTHER REFERENCES

Rankin: "Manual of Tree Diseases," published by MacMillan Co. (N. Y.), 1918, pp. 348–351.

Wilson: "Pyroxylin Enamels and Lacquers," published 1927 by Van Nostrand Co. (N. Y.), 2nd ed., pp. 66, 67, 252.

Chemical Abstracts, vol. 25, p. 221 (1931).

Chemical Abstracts, vol. 36, col. 3318 (1942).

Condensed Chemical Dictionary, published 1942 by Reinhold Pub. Co. (N. Y.), 3rd ed., pp. 129, 385, 386.

Hackh's Chemical Dictionary, 3rd ed., published 1944, page 475.